United States Patent [19]

Kriebel et al.

[11] Patent Number: 5,049,080
[45] Date of Patent: Sep. 17, 1991

[54] WATERWHEEL DEMONSTRATING APPARATUS

[75] Inventors: Mahlon E. Kriebel; James W. Holsapple, both of Syracuse, N.Y.

[73] Assignee: Kriebel and Holsapple, Inc., Syracuse, N.Y.

[21] Appl. No.: 554,473

[22] Filed: Jul. 19, 1990

[51] Int. Cl.$^5$ ............................................. G09B 23/00
[52] U.S. Cl. .................................. 434/300; 434/126; 446/166
[58] Field of Search ................ 434/126, 300; 446/153, 446/155, 166, 167, 176, 267; 40/406, 479

[56] References Cited

U.S. PATENT DOCUMENTS

| | | | |
|---|---|---|---|
| 362,421 | 5/1887 | Buddington | 446/166 |
| 3,040,446 | 9/1962 | Ellinger | 434/126 |
| 3,253,354 | 2/1966 | Gollner et al. | 434/300 |
| 3,412,482 | 3/1967 | Kusmer | 434/300 |
| 3,425,152 | 3/1967 | Foulkes | 446/166 |
| 3,478,444 | 11/1969 | Presnell et al. | 434/126 |
| 3,613,264 | 4/1971 | Vitka et al. | 434/126 |
| 3,987,307 | 10/1976 | Giconi | 446/166 X |
| 4,959,819 | 9/1990 | Haczewski | 446/166 X |

Primary Examiner—Richard J. Apley
Assistant Examiner—Glenn E. Richman
Attorney, Agent, or Firm—Wall and Roehrig

[57] ABSTRACT

A chaos waterwheel teaching device is provided for demonstrating and illustrating to students that random appearing phenomena occurring in natural systems such as biological, chemical, physical, and mathematical may actually reflect the action of simple underlying non-random processes or deterministic systems that illustrate basic concepts of dynamics and chaos theory. A dual wheel device is provided in which one wheel is driven by a stream of water and the other wheel acts as a brake, resisting the rotation created by the first wheel by dragging a series of vanes through a water bath. The operation of the device can be varied and controlled by varying one or the other of the parameters, including the water level in the braking compartment to cause different states of operation, namely periodic or chaotic.

14 Claims, 5 Drawing Sheets

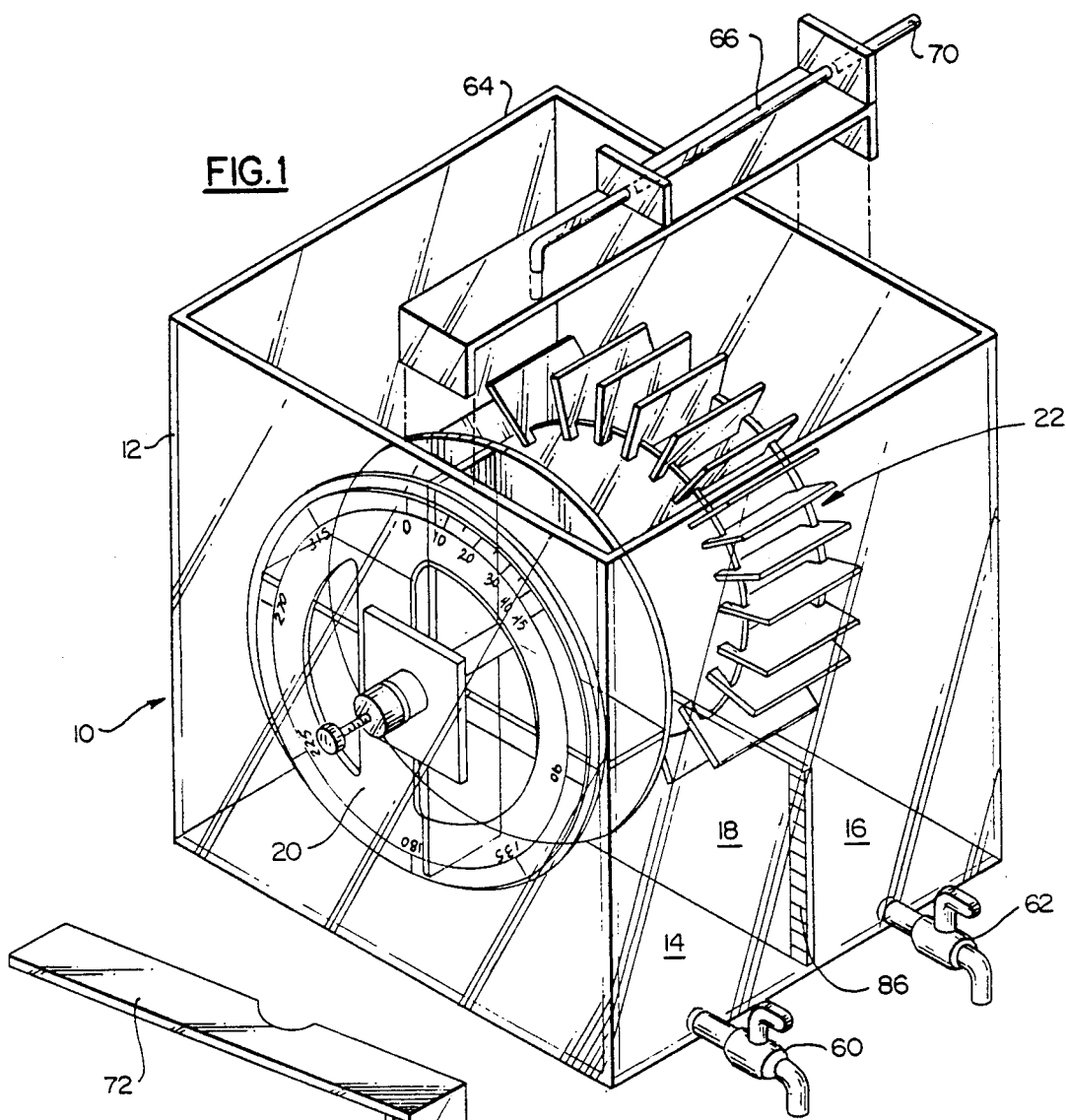
FIG. 1
FIG. 9
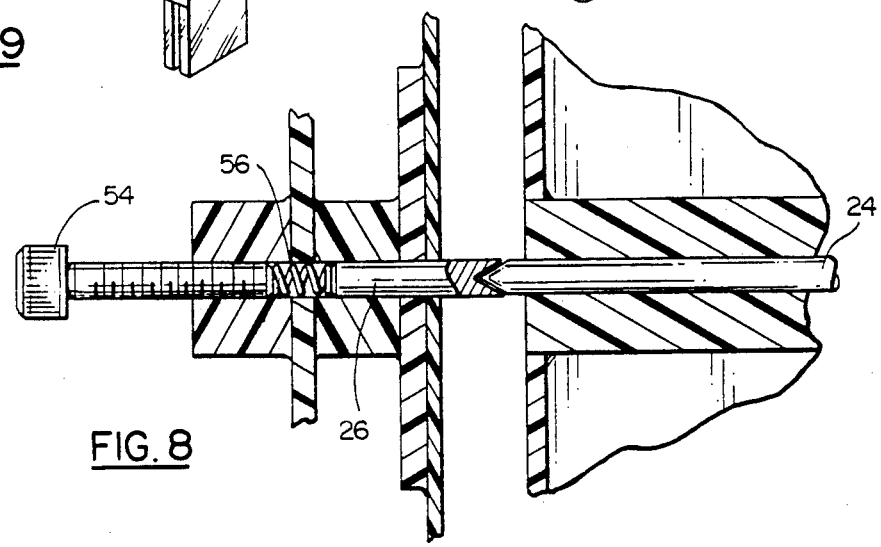
FIG. 8

WATERWHEEL DEMONSTRATING APPARATUS

BACKGROUND OF THE INVENTION

This invention relates to an apparatus and method for demonstrating scientific principles involved in simple and complicated relationships. More particularly, this invention relates to a device and method for demonstrating simple and complicated deterministic behavior to illustrate basic concepts of dynamics and chaos theory.

In the teaching field, it has long been accepted practice to use models or experiments to demonstrate abstract principles and the relationship between different phenomena found in the world about us. Over the years various devices for demonstrating the more basic principles of physics and chemistry have been readily available. Computer simulation of more sophisticated system relationships have begun to be available for teaching purposes. In many instances they are very helpful but physical apparatus, allowing hands-on manipulation to demonstrate abstract conceptual relationships between a variety of systems, has been virtually unavailable.

Those models that have been available have tended to be either extremely simple devices for beginning students or extremely complex systems for very advanced students.

OBJECTS AND SUMMARY OF THE INVENTION

It is therefore an object of the present invention to provide a simple, easily operated device for demonstrating abstract relational principles of every day common phenomena.

It is another object of the present invention to provide a water wheel apparatus for demonstrating dynamic motion of periodic and chaotic states.

It is a further object of the present invention to provide an easily operated physical model that can be simply and easily operated with obvious changes in operation occurring from small changes in manipulation parameters.

It is yet a further object of the present invention to provide an apparatus and method for demonstrating basic concepts of dynamics and chaos for use in teaching pattern recognition concepts.

It is a still further object of the present invention to provide an apparatus for demonstrating simple and complex interrelationships in random appearing phenomena that in actuality are based upon simple underlying non random processes.

It is a still further object of the present invention to provide an apparatus and method by which a wide variety of experiments can be performed by students to demonstrate various types of interrelationships of natural systems such as biological, chemical and mathematical problems encountered in daily living.

It is yet a further object of the present invention to provide an apparatus and method for demonstrating abstract relational principles by manipulating a dual water-wheel apparatus that can be adjusted to characteristic behavior from periodic to a periodic to chaotic motion.

In one embodiment this is accomplished by an apparatus having a first water-wheel actuated by a stream of water directly coupled to a second water-wheel having a plurality of vanes rotated through a water bath by said first wheel which acts as a variable breaking force for controlling the rotary motion of the apparatus depending upon the variables chosen.

BRIEF DESCRIPTION OF THE DRAWINGS

Further objects of the invention, together with additional features contributing thereto and advantages accruing therefrom will be apparent from the preferred embodiment of the invention shown in the accompanying drawings wherein:

FIG. 1 is a perspective view of the apparatus according to the present invention;

FIG. 8 is a detail on an enlarged scale of the adjustable friction spring for varying the frictional resistance to rotation of the shaft of FIG. 7;

FIG. 9 is a perspective view of the water-diverter which is slidably mounted at the top of the apparatus of FIG. 1.

DETAILED DESCRIPTION OF THE PREFERRED EMBODIMENT

Figure 7:
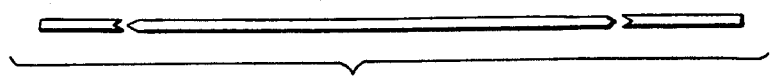
FIG. 7 is a plan view of the axle on which the first and the second water-wheels are mounted for rotation within the enclosure.

Referring now to FIG. 1, the water-wheel apparatus 10 of the present invention comprises an enclosure 12 generally of transparent material formed into a pair of compartments adapted to contain therein water or other fluids such as the compartment in the left-hand side of FIG. 1, designated 14 and the compartment 16 on the right side thereof formed by dividing partition 18 which is sealed to the bottom of the closure 12 and each end wall to a height approximately one-third to one-half the overall height of the container 12. Container 12 is generally open at the top and has rotatably mounted therein a first waterwheel 20 and a second waterwheel 22. The waterwheels 20 and 22 are fixed to a shaft 24 (FIGS. 7 & 8), which is rotatably mounted within the container 12 about pivot points 26 and 28. mounted in the left and right walls (See FIG. 2).

As may be seen in FIGS. 1-4, the first water-wheel 20 has four vanes 40, 42, 44, and 46 disposed at ninety degrees around the axis thereof, with each vane colored a different color for easy recognition by the student using the device. Also concentrically mounted with the waterwheel 20 but fixed to the outer wall is a 360 degree protractor 30 shown in perspective in FIG. 3. The protractor is basically glued to a plate 32 which in turn is secured to an annular spacer 34 which is fixed to the outer wall of the container 12, but centered about the shaft 24 on which the wheel is mounted. The upper right-hand quadrant of the protractor 30 has a color pie-shaped sector 36 for easy recognition as the key operating quadrant for use of the device. In this particular case, it is colored yellow and is generally transparent so that the vanes 40-46 of the wheel 22 can be readily seen therethrough when they come to rest within the upper right-hand quadrant of the 360 degree protractor 30. This configuration of the protractor 30 can be seen at both FIG. 3 and FIG. 5. The vanes 40, 42, 44 and 46 are shown at the 0, 90, 180, and 270 degree positions in FIG. 5.

Referring now to FIG. 8, the pivot points 26 and 28 are pointed shaft segments which extend into the enclosure 12 and are mounted in blocks adhesively or otherwise secured to the side faces of the container 12 so that they may be fixed by a set screw 50, in the desired position in the side wall of the container 12. As shown in FIG. 8, the set screw 50 is positioned to engage the pivot point 26 so as to lock it in adjusted position for maintaining the desired frictional contact with the shaft 24. A similar pivot point 28 is positioned on the other side as may be seen in FIG. 2 and is locked in position by a set screw 52 to support the other end of the shaft 24. In this fashion, the waterwheels can be rotatably supported within the enclosure 12 with whatever desired predetermined friction is indicated to be applied to the rotation of the shaft 24. In operation, the adjusting screw 54 will be used through spring 56 to apply an axial force on the pivot point 26 before tightening of the set screw 50 to apply the desired axial friction to the shaft 24 so as to resist rotation of the waterwheel assemblies. After the desired frictional force is applied, the set screw 50 may be tightened, or it may be left free, depending on the intended operation of the device.

While a static functional drag as provided by spring 56 is helpful in controlling the operation of the device, the particular periodic or chaotic action of the device is produced by a dynamic braking force proportional to the velocity of rotation of the device, as will be described in detail herein.

Enclosure 12, as described above, is divided basically into two compartments by partition 18. Each compartment 14 and 16 has positioned at the bottom thereof, at one edge, a drain valve for draining water or other fluid from the respective compartments. The valves 60 and 62 are provided to control the discharge of fluid from the respective compartments. As will be described in more detail herein, generally, the valve 60 is positioned in the open condition to continuously drain any water or other fluid impinging on the wheel 20 directly from the enclosure. The valve 62, on the other hand, is normally in the closed position to maintain a predetermined fluid level within the compartment 16.

Figure 2:
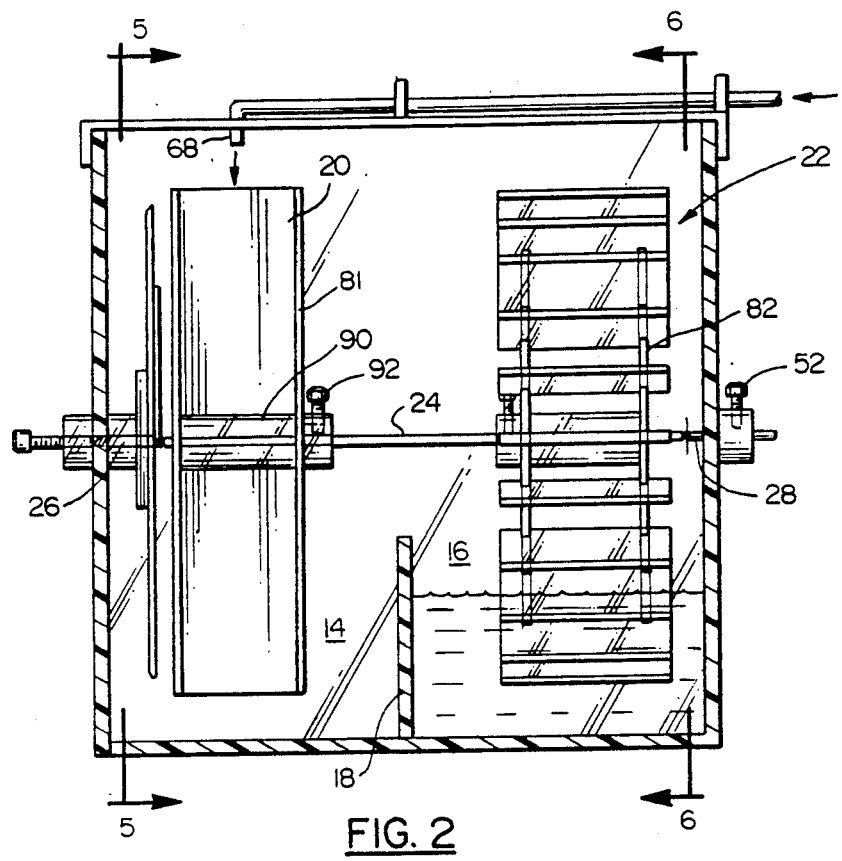
FIG. 2 is a cross sectional view of the device of FIG. 1, taken from the right-hand end of FIG. 1.
Figure 3:
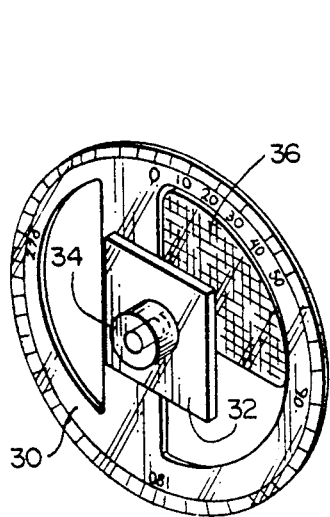
FIG. 3 is a perspective view of the angle indicating scale used to determine rotation of the device.
Figure 4:
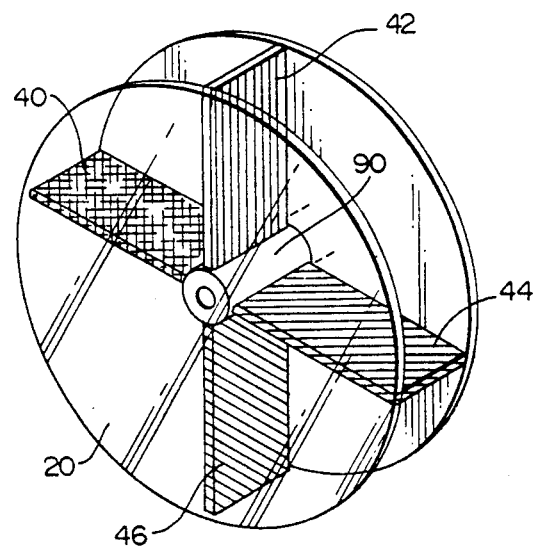
FIG. 4 is a perspective view of the first water-wheel shown on the left of FIG. 2.

As may be seen in FIGS. 1 and 2, bracket 64 is slidably mounted along the top edge of the side walls of the enclosure 12. A fluid input tube 66 is mounted on top of brackets 64 so as to discharge water downwardly through orifice 68 onto the four vane waterwheel 20. See also FIGS. 5 and 6. Discharge 68 can be slidably positioned relative to the shaft 24 so as to position the point of discharge of water either at the zero degree or upright point of one of the vanes or to the left or right of shaft 24, FIG. 1, as desired, to demonstrate a particular physical phenomenon. When the discharge 68 is positioned directly on center of the zero degree mark, water will impinge on the vane of water-wheel 20 positioned at the zero location and fall onto either side of it so that the wheel is basically in a static, but unstable condition. Water or other fluid is applied to the discharge 68 by connecting a source of fluid, not shown, to the other end 70 of the tube 66 in any known conventional manner. The flow of water is adjusted for the desired demonstration effect to the appropriate level by the water supply means and is then fed through the tube to the discharge end 68 where it is allowed to impinge on the vanes of the wheel 20.

Figure 5:
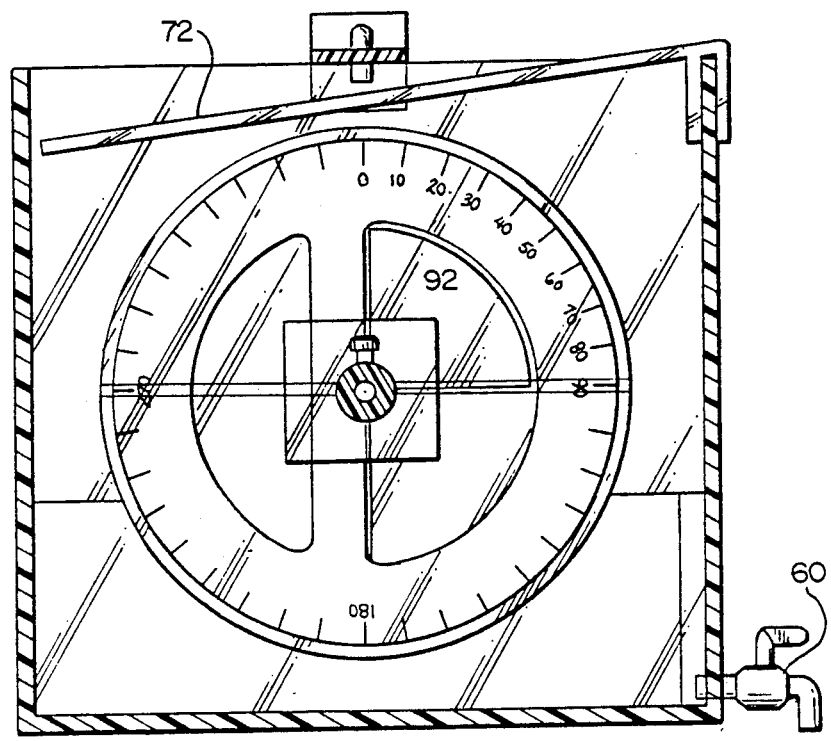
FIG. 5 is a cross sectional view of the apparatus of FIG. 2, taken on line 5—5 of FIG. 2.

Additionally, there is shown in FIGS. 5 and 9 a deflector plate 72 which may be selectively positioned by sliding along the upper edge of one end of the enclosure 12 so as to position the plate underneath the nozzle 68 to deflect the water stream from impinging upon the vanes of the wheel 20. This allows the apparatus to be set in place for a particular experiment without having to turn the water on and off at the water supply source. Once the apparatus is set as desired, the deflector plate 72 can be moved laterally out from under the discharge pipe 68 to allow water to again impinge upon the wheel 20.

Figure 6:
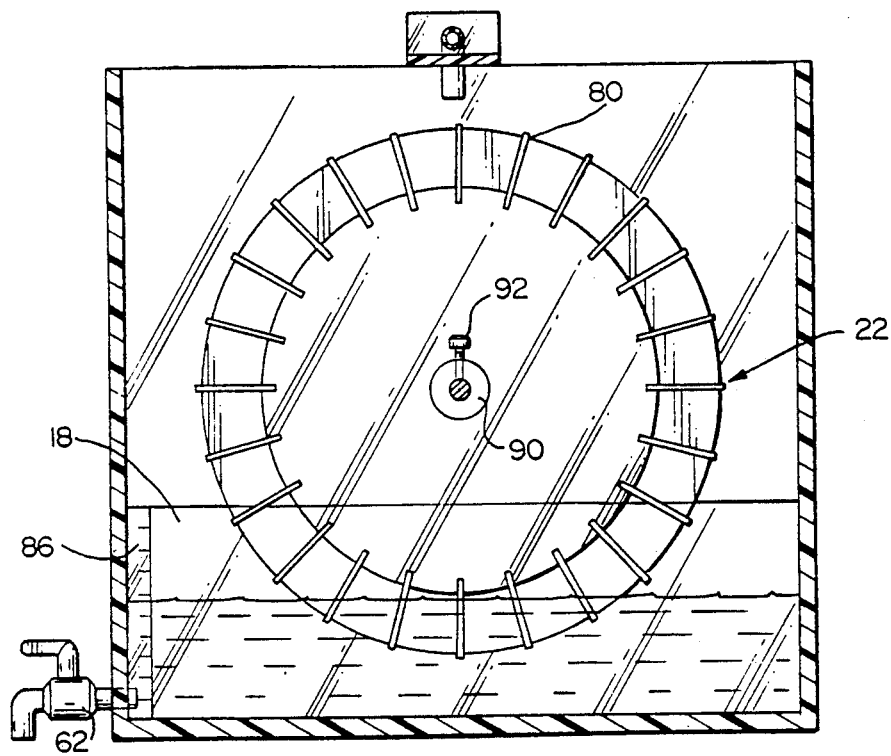
FIG. 6 is a cross sectional view taken on line 6—6 of FIG. 2.

Referring now to FIGS. 2 and 6, the wheel 22 will now be described in detail and its relationship to wheel 20 explained. Wheel 22 is approximately the same diameter as the wheel 20, but instead of four vanes extending from the center of the wheel to the periphery the wheel 22 has some twenty-four paddle vanes 80 disposed about the circumference thereof in paddle wheel fashion. The wheel consists of a pair of disks 82 of transparent material which are slotted to receive the disks 82 which are cemented thereto to form the paddle wheel structure shown in FIGS. 2 and 6.

The wheels 20 and 22 are designed so that the wheel 20 is the driving wheel being turned by the water from the nozzle 68 and wheel 22 is the driven wheel which also acts as a dynamic braking wheel through interaction with water or other fluid placed in the compartment 16. As may be seen in FIGS. 2 and 6, liquid is maintained at a level in the compartment 16 such that the vanes 80 are substantially immersed in the liquid at the bottom of the wheel 22. The precise level of the water in compartment 16 will of course determine how many and to what extent the vanes 80 on the wheel 22 are immersed in water. The wheel 22 then, as it is rotated through the water and compartment 16, will encounter frictional resistance due to the vanes passing through the water and will act as a brake or force resisting rotation, whether it be in the forward or backward direction. This friction will be greater at greater RPMs and less at lesser RPMs, and will depend in part upon the viscosity of the fluid in the compartment 16 and thus is a dynamic as opposed to static braking force. A scale 86 is provided on the partition 18 for purposes of helping to determine the level of water for a particular mode of operation of the device.

Each of the wheels 20 and 22 generally include a hub portion 90 mounted on the shaft 24 and a pair of side plates 81 and 82 which are generally cemented to the hub 90 perpendicularly to shaft 24. The hubs 90 are fixed to shaft 24 by a set screw 92 to position the wheels 20 and 22 in their respective compartments 14 and 16.

Referring now to the operation of the device for demonstrating various scientific principles, the apparatus is set up with a predetermined level of water generally in the range of four to eight centimeters. While water is the usual fluid of choice, when desired other fluids can be used in the compartment 16. The particular depth is chosen to illustrate the desired characteristic for the experiment to be run or the principle to be demonstrated by rotation of the wheels within the housing. The depths indicated are for water, but for other fluids having different viscosities, obviously other depths would be desired.

In general, the water supply for the wheel 20 is adjusted to provide a supply of somewhere from 150 to 400 ml per minute with the preferred range being around 300 ml per minute for most experimental demonstrations. In a preferred embodiment, the wheels 20 and 22 have a diameter of approximately eight inches with a width between the side disk of approximately two inches and with the vanes on the wheel 22 having a width of three inches and a radial length of approximately an inch-and-a-half. With this configuration, the water input supply has been found to be satisfactory by connecting a half-inch diameter, clear plastic tubing to the configuration shown. With a wheel 22 dimensioned as above and mounted at a point approximately five inches above the bottom of the compartment 16, by adjusting the flow to 300 ml per minute, and by adjusting the depth of water in the compartment 16 to approximately 80 mm. depth, the proper relationships to demonstrate periodic, aperiodic and chaotic behavior are established.

With parameters as indicated above, the device will exhibit periodic motion as follows:

1) Position one of the vanes of the wheel 20 at approximately the twenty degree mark from vertical in the upper right hand quadrant and 2) Allow the water to fall vertically along the zero degree line.

This will result in the compartment in the upper right-hand quadrant of the wheel 20 formed by the vane at twenty degrees and the next adjacent vane ninety degrees therefrom slowly filling with water until finally the static friction of the device is overcome and the wheel will rotate to the right in FIG. 5 to dump the water out of the quadrant in which it has been falling. As this happens, it will cause the wheel to rotate sufficiently so that the next vane passes beyond the zero degree point and the left hand quadrant in FIG. 5 then begins to fill with water. This action will repeat until the left-hand quadrant fills up enough to overcome the friction and the wheel will then be rotated in the counter-clockwise direction of FIG. 5, dumping the water and bringing the original quadrant back at the zero degree point to allow the original right-hand quadrant to start to fill again. The damping caused by the wheel 22 in the water in compartment 16 is sufficient to cause this type of action so that the water wheel 20 becomes a water clock. As long as the water input is maintained constant and the water level in the compartment 16 is maintained about 80 mm, periodic clock motion will continue.

If the water level in compartment 16 is gradually lowered, the angular motion of the wheel 20, for each oscillation, will increase until the wheel "escapes" and shows apparent random stop angles and direction of turning. At this point, the wheel is demonstrating aperiodic motion and appears to be rotating and stopping in a random fashion without any deterministic content.

By utilizing the device of the present invention, it can be shown, however, that systems of this type are in fact not operating in a random fashion, but rather in a deterministic fashion exhibiting chaotic properties. Utilizing the device of the present invention, we can obtain data from a sufficient number of cycles to construct a map of the behavior of the device which, upon analysis, will show that it is actually behaving according to chaotic theory and not acting in a purely random manner.

Figure 10:
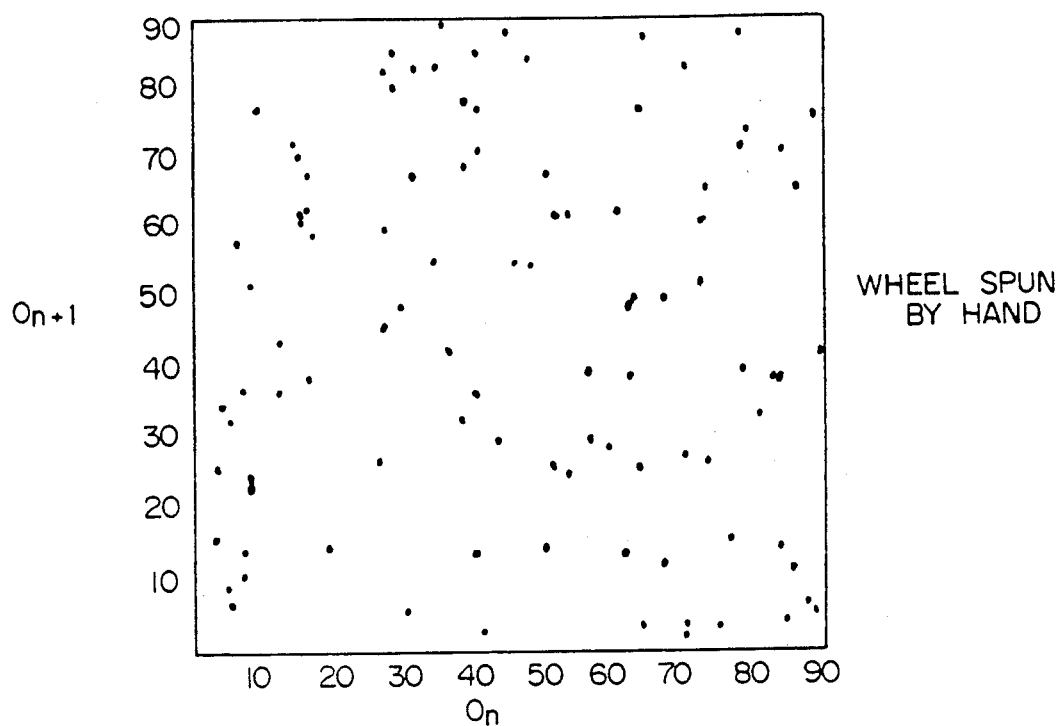
FIG. 10 is a plot of the angular displacement of the wheel when spun by hand.

If the device of the present invention is spun by hand and the angle of stopping of the vane in the upper right hand quadrant is mapped, the results will be as shown in FIG. 10. The map is obtained, on a chart having 0 to 90 degrees in both an x and y direction, by plotting a point on the chart on the horizontal axis equal to the starting angle of the cycle of rotation of the wheel and on the vertical axis equal to the ending angular position of the vane after stopping. The next point on the chart will start on the x axis at the first cycle stopping angle and on the y axis at the second cycle stopping angle. If this is repeated for a large number of cycles, a truly random scattering of points will be obtained as shown in FIG. 10. In FIG. 10, the angular starting point from 0 to 90 is plotted on the abscissa and the stopping point from 0 to 90 is plotted on the ordinate. When the device as described is spun by hand, the pattern shown in FIG. 10 is the result.

Figure 11:
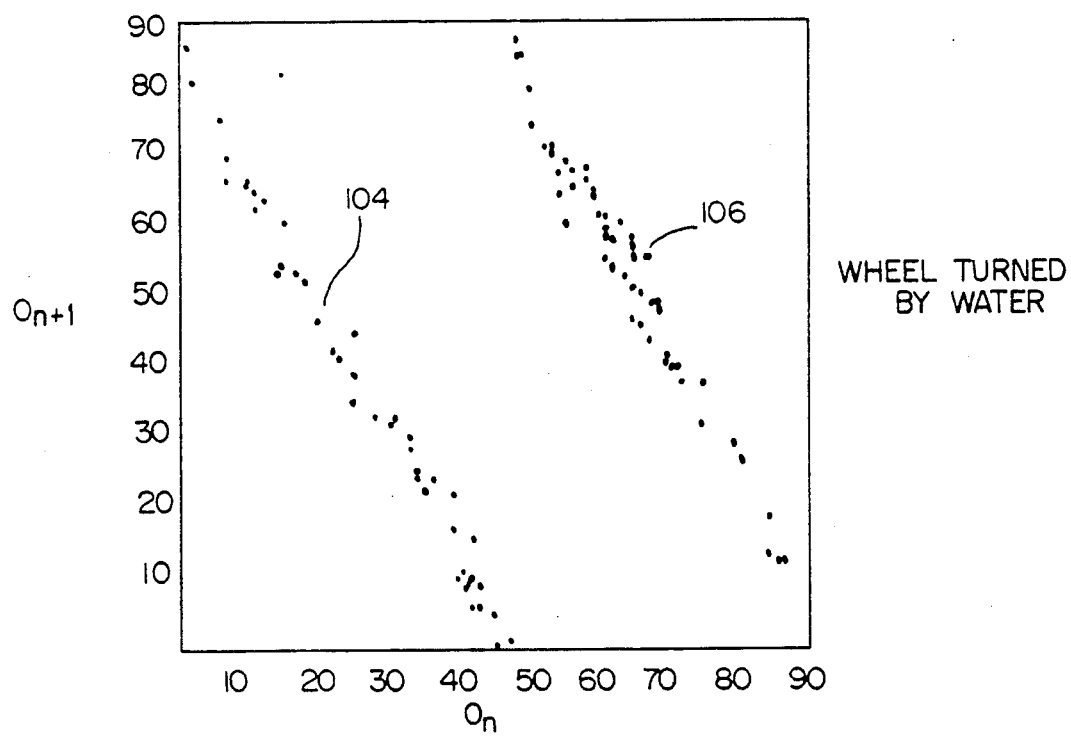
FIG. 11 is a plot similar to FIG. 10 when the wheel is turned by water.

When the device is powered by a stream of water, as described above, and the water level in compartment 16 lowered sufficiently to encounter apparent random motion, if the starting and ending points of each cycle are again plotted for a number of cycles, a pair of function lines will become clearly discernable in which a large number of points will fall within a very small spacing of a characteristic curve, which in some cases approaches a straight line. As can be seen in FIG. 11, the behavior of the water wheel has now become very definitely deterministic although a visual observation of the motion of the wheel would tend to indicate a random action.

Figure 12:
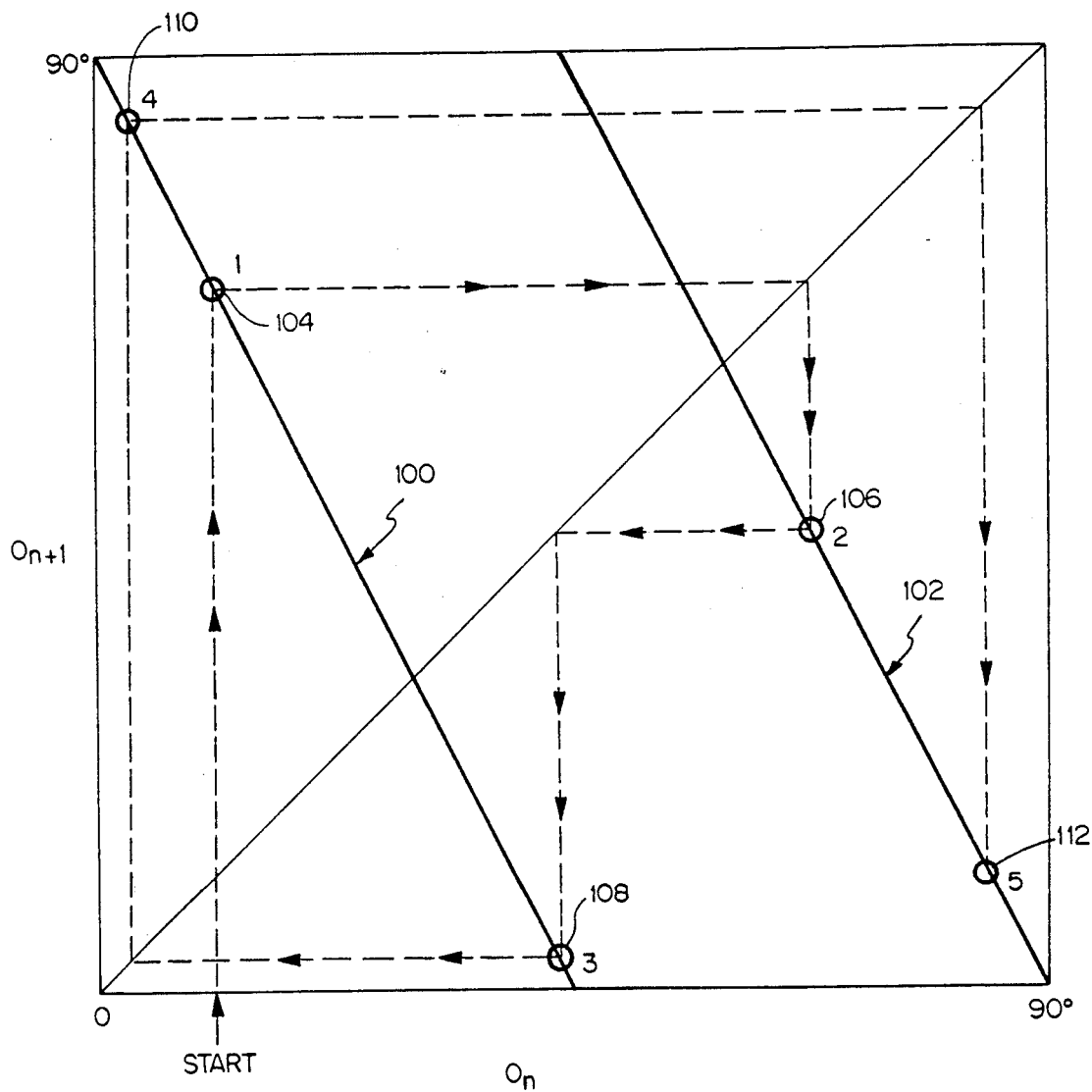
FIG. 12 is a diagrammatic representation of the predictability of the function shown in FIG. 11.

Referring now to FIG. 12, if the characteristic curves of FIG. 11 are simplified into the form of the two solid lines 100 and 102, which can be identified as the function lines, if we then form a square representing 0° to 90° in both the abscissa and ordinate directions, and if we bisect the square from 0/0 to 90/90 with a straight line, which is known as the identity line, we can demonstrate the predictability of the device and the student can verify this predictability, proving the chaotic theory for an apparent random physical occurrence. In FIG. 12, if we start at the point indicated "start", which might represent an angle of 10°, and proceed vertically until we hit the first function line at 104, we can see that this represents a stopping angle of approximately 75 degrees. Then if we want to predict where the next stopping angle will be, we will go horizontally across to the identity line and then vertically down or up as the case may be until we intersect another function line, namely 102 at 106. At this point, it can be seen that we would be at an angle of about 50 degrees for the stopping point, after having started at a starting point of some 70 or 80 degrees. Starting at 50 degrees or so to determine the stopping point of the next iteration we would go horizontally to the identity line and then vertically down, or up as the case may be, to the next function line which would be two or three degrees at 108. For the third iteration, following across to the identity line and up to the function line at 110, showing a stopping angle of about 90 degrees. For a fourth iteration, again follow across to the identity line and down to 112, etc.

To complete the teaching sequence we could set up the device of the present invention and reproduce within very close tolerances, the points diagrammed from the basic data developed for FIG. 11 and shown diagrammatically in FIG. 12. We would thus have been able to show how a device can be made to obtain data and to construct a map showing that it is more than just random and then to demonstrate in actual physical function the chaotic theory underlying the observed data.

Reproducibility of a particular pattern, of course, depends upon maintaining conditions as near identical as possible for the different trial runs. If desired, the water level in compartment 16 can be changed and points then again recorded of stopping and starting of the wheel. It has been found that the characteristic function lines, as shown in FIG. 11, tend to become somewhat more curved or approach a more nearly vertical condition with somewhat closer spacing and sometimes even additional function lines depending on whether the water level, and hence, braking, is increased or decreased. This merely illustrates that for a different set of conditions, the functions are different but still deterministic.

We have thus provided a real physical system that can be readily observed, tested, modified and experimented with by students to illustrate and to derive various types of dynamic system behavior, both periodic and aperiodic. The device thus becomes a very practical and simplified apparatus for demonstrating simple and complex dynamic systems exhibiting apparent random phenomena, but which are really non-random or chaotic systems.

While we have described the foregoing apparatus as a waterwheel and have referred to water as being the medium for powering the four-vane wheel and for applying braking friction to the multi-vane wheel, it should be understood that other liquids can be used and that other friction means could be applied to resist rotation imparted to the system from the powered water wheel.

While this invention has been explained with reference to the structure disclosed herein, it is not confined to the details as set forth, and this application is intended to cover any modifications and changes as may come within the scope of the following claim.

What is claimed is:

1. A device for demonstrating scientific principles comprising:
   an enclosure adapted to contain a liquid having at least two compartments;
   a first vaned wheel rotatably mounted in one of said compartments;
   a second vaned wheel rotatably mounted in another of said compartments;
   said first and second vaned wheels being interconnected for simultaneous rotation, together when one wheel is rotated;
   said first vaned wheel having four vanes spaced at 90° intervals thereabout extending from the axis to the circumference thereof;
   said second vaned wheel having a plurality of vanes spaced about the circumference thereof;
   means for maintaining a predetermined level of liquid in the compartment in which said second wheel is mounted so as to contact some of said plurality of vanes;
   liquid flow means for causing a predetermined stream of liquid to impinge upon said first vaned wheel; and
   drain means for keeping said first wheel compartment empty of liquid;
   whereby said first wheel is caused to rotate and in turn rotate the second wheel driving the vanes of said second wheel through the liquid in said second wheel compartment.

2. A device as described in claim 1 wherein one side of said first wheel is transparent and said four vanes of said first wheel are each colored a different color.

3. A device as described in claim 2 further including an angular scale, fixed adjacent one side of said first wheel, having at least one quadrant of graduations from 0 to 90 degrees so as to indicate angular displacement of the vanes of said wheel.

4. A device as described in claim 1 wherein said liquid flow means includes adjusting means for varying the position of the liquid stream impact on said first wheel transversely of the axis of said first wheel.

5. A device as described in claim 4 further including means for varying the rate of flow of said liquid.

6. A device as described in claim 1 wherein said means for maintaining a predetermined level of liquid in the second wheel compartment includes valve means for varying the liquid level so as to change the braking effect of said second wheel on the system.

7. A device as claimed in claim 1 wherein said first and second vaned wheels are mounted on the same shaft for rotation within said enclosure.

8. A device as claimed in claim 7 wherein said shaft is mounted at one end on a fixed pivot point; and said shaft is mounted at the other end on an axially moveable pivot point and said movable pivot point includes a spring urging said point into frictional contact with said shaft.

9. A device as described in claim 8 including adjusting means for varying the force said spring exerts on said movable pivot point whereby the amount of friction retarding rotation of said wheels may be varied.

10. A device as described in claim 4 including movable deflector means slidably mounted in said enclosure for movement into and out of said liquid flow stream to selectively interrupt impingement of said stream of liquid on said first wheel.

11. A device for demonstrating scientific principles comprising:
    a frame member;
    a wheel rotatably mounted in said frame member having a plurality of enclosed pie shaped compartments open at the circumference of said wheel;
    liquid flow means positioned vertically above the axis of said wheel for directing a stream of liquid into said compartments to permit rotation of said wheel in either direction;
    dynamic friction means operatively connected to said wheel, said dynamic friction means being dynamically variable as a function of speed of rotation of said wheel; and
    means for varying the amount of dynamic friction applied by the dynamic friction means to cause different types of periodic and aperiodic motion of the wheel.

12. A device as described in claim 11 wherein said wheel has four pie shaped enclosed compartments.

13. A device as described in claim 11 wherein said dynamic friction means includes a vaned wheel operatively connected to said compartmented wheel and mounted for rotation through a body of liquid.

14. A device as described in claim 13 wherein said means for varying the dynamic friction means comprises valve means for varying the level of liquid in the body of liquid in which said vaned wheel rotates.

* * * * *